United States Patent
Surcouf et al.

(10) Patent No.: US 10,904,365 B2
(45) Date of Patent: Jan. 26, 2021

(54) VIRTUALIZED MEDIA PROCESSING PIPELINE

(71) Applicant: Cisco Technology, Inc., San Jose, CA (US)

(72) Inventors: Andre Jean-Marie Surcouf, St Leu la Foret (FR); Clarence Filsfils, Brussels (BE); Francois Clad, Strasbourg (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 177 days.

(21) Appl. No.: 15/794,334

(22) Filed: Oct. 26, 2017

(65) Prior Publication Data

US 2018/0219982 A1    Aug. 2, 2018

Related U.S. Application Data

(60) Provisional application No. 62/451,556, filed on Jan. 27, 2017.

(51) Int. Cl.
| | | |
|---|---|---|
| *H04L 29/06* | (2006.01) | |
| *G06F 9/455* | (2018.01) | |
| *H04L 12/931* | (2013.01) | |
| *H04L 12/24* | (2006.01) | |

(52) U.S. Cl.
CPC .......... *H04L 69/22* (2013.01); *G06F 9/45558* (2013.01); *H04L 41/5054* (2013.01); *H04L 49/70* (2013.01); *G06F 2009/45583* (2013.01); *G06F 2009/45595* (2013.01); *H04L 41/509* (2013.01)

(58) Field of Classification Search
None
See application file for complete search history.

(56) References Cited

U.S. PATENT DOCUMENTS

| | | | | |
|---|---|---|---|---|
| 2010/0202508 | A1* | 8/2010 | Karaoguz | H04N 21/2381 375/240.01 |
| 2014/0064293 | A1* | 3/2014 | Deisinger | H04L 47/32 370/412 |
| 2014/0313278 | A1* | 10/2014 | Periyannan | H04L 65/403 348/14.08 |
| 2015/0139080 | A1* | 5/2015 | Ellenbeck | H04W 52/0216 370/329 |
| 2015/0365664 | A1* | 12/2015 | Yousefi | H04N 7/183 375/240.02 |
| 2016/0165169 | A1* | 6/2016 | Kim | H04L 1/00 348/724 |
| 2017/0371694 | A1* | 12/2017 | Kim | G06F 9/45558 |

* cited by examiner

*Primary Examiner* — Noel R Beharry
*Assistant Examiner* — Richard Schnell
(74) *Attorney, Agent, or Firm* — Polsinelli PC

(57) ABSTRACT

Aspects of the disclosed technology provide virtualized solutions for processing media frames. A process of the disclosed technology can include steps for receiving unprocessed media packets, de-packetizing the unprocessed media packets to produce unprocessed media frames, and sending the unprocessed media frames to a virtual media application. In some aspects, the process may further include steps for processing the unprocessed media frames, using the virtual media application, to produce processed media frames. Systems and machine-readable media are also provided.

14 Claims, 6 Drawing Sheets

VIRTUALIZED MEDIA PROCESSING PIPELINE

CROSS-REFERENCE TO RELATED APPLICATIONS

This application claims the benefit of U.S. Application No. 62/451,556 filed Jan. 27, 2017, entitled "PROCESSING PIPELINE USING V6SR", which is incorporated herein by reference in its entirety.

BACKGROUND

1. Technical Field

The subject technology relates to the optimization of data processing and in particular, to infrastructure and tools to facilitate real-time processing of media data using an application pipeline where involved data are not individual internet protocol (IP) packets.

2. Introduction

Network Function Virtualization (NFV) technology, in combination with Software Defined Networking (SDN), promises to help transform today's carrier networks. It will transform how they are deployed and managed, and the way services are delivered. Some ultimate goals are to enable service providers to reduce costs, increase business agility, and accelerate the time to market of new services.

The utilization of NFV and SDN technologies allows the decoupling of network functions from underlying hardware so they run as software images or logical modules on commercial off-the-shelf and purpose-built hardware. NFV does so by using virtualization technologies (computers, networks, and storage media) to virtualize network functions. The objective is to reduce dependence on physical devices by allocating and using physical and virtual resources only when and where needed. With such approaches, service providers can reduce overall costs by shifting components to a common physical infrastructure while optimizing its use, allowing them to respond more dynamically to changing market demands by deploying new applications and services as needed. The virtualization of network functions accelerates the time to market for new services by allowing for more automated and streamlined approaches to service delivery.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

The production and processing of media data (e.g., audio/video data) typically involves hardware based devices. Hardware-based capture devices, such as video cameras and microphones, produce media streams that can be edited/processed by hardware-based systems, for example, such as physical Serial Digital Interface (SDI) cards. However, physical media processing devices, such as SDI cards, can take up large amounts of physical space, and are difficult to allocate for efficient media stream processing, for example, in a cloud or media data center (Media-DC) environment. It would be advantageous to virtualize media processing applications that are typically performed by hardware modules, such as SDI cards, such that different processing functions could be conveniently applied to internet protocol (IP) based media streams.

Description:

Aspects of the subject technology address the foregoing need by providing methods and systems for virtualizing media application processing. In some aspects, virtualized media processing applications may be used to process a media stream in a predetermined order, e.g., to function as a virtualized media processing service chain.

As discussed in further detail below, packetized media streams can be sourced to various media applications using internet protocol (IP) routing provided in the network's control plain, e.g., using virtual or physical switches or routers. Media stream data is de-packetized into frames before being provided to a respective virtual media application (also "virtual function"), e.g., via a designated shared memory space. Because the processing applications reside in a virtual environment, processed media streams may be provided to subsequent applications in the processing chain, e.g., in the same container or group of containers (pod), without the need for re-packetization and IP transport. Alternatively, processed media frames may be re-packetized and provided to a subsequent media application via routing performed in the control layer.

Figure 1:
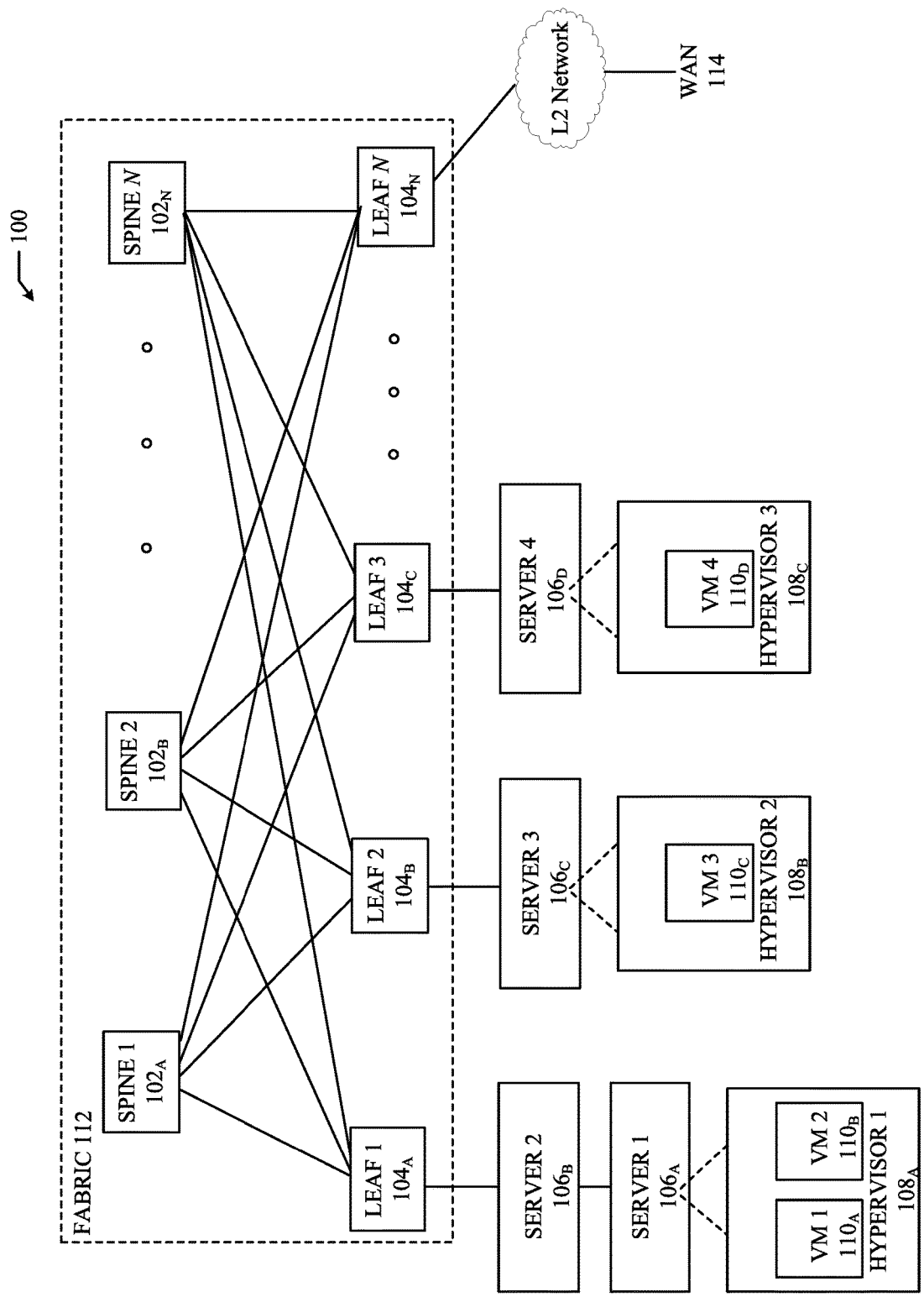
FIG. 1 illustrates an example of a network environment, in which some aspects of the technology can be implemented.

FIG. 1 illustrates a diagram of an example network environment 100 in which various network function virtualization (NFV) applications can be implemented to form a media processing service chain (SC). Fabric 112 can represent an underlay (i.e., the physical network) of environment 100. Fabric 112 includes spine switches 1-N($102_{A-N}$) (collectively "102") and leaf switches 1-N($104_{A-N}$) (collectively "104"). Leaf switches 104 can reside at the edge of fabric 112, and can represent the physical network edges. Leaf switches 104 can be, for example, top-of-rack ("ToR") switches, aggregation switches, gateways, ingress and/or egress switches, provider edge devices, and/or any other type of routing or switching device.

Leaf switches 104 can be responsible for routing and/or bridging tenant or endpoint packets and applying network policies. Spine 102 can perform switching and routing within fabric 112. Thus, network connectivity in fabric 112 can flow from spine switches 102 to leaf switches 104, and vice versa. Leaf switches 104 can include servers 1-4 ($106_{A-D}$) (collectively "106"), hypervisors 1-3 ($108_A$-$108_C$) (collectively "108"), virtual machines (VMs) 1-4 ($110_A$-$110_D$) (collectively "110"). For example, leaf switches 104 can encapsulate and decapsulate packets to and from servers 106 in order to enable communications throughout environment 100. Leaf switches 104 can also connect other network-capable device(s) or network(s), such as firewalls, databases, and servers, etc., to fabric 112. Leaf switches 104 can also provide any other servers, resources, endpoints, external networks, VMs, services, tenants, or workloads with access to fabric 112.

Servers 106 can include hardware and software necessary to implement a virtualized media datacenter of the subject technology. For example, various virtual media applications may be instantiated in one or more compute nodes (servers 106), for example in one or more of VMs 110, and/or one or more network containers (not illustrated).

Figure 2:
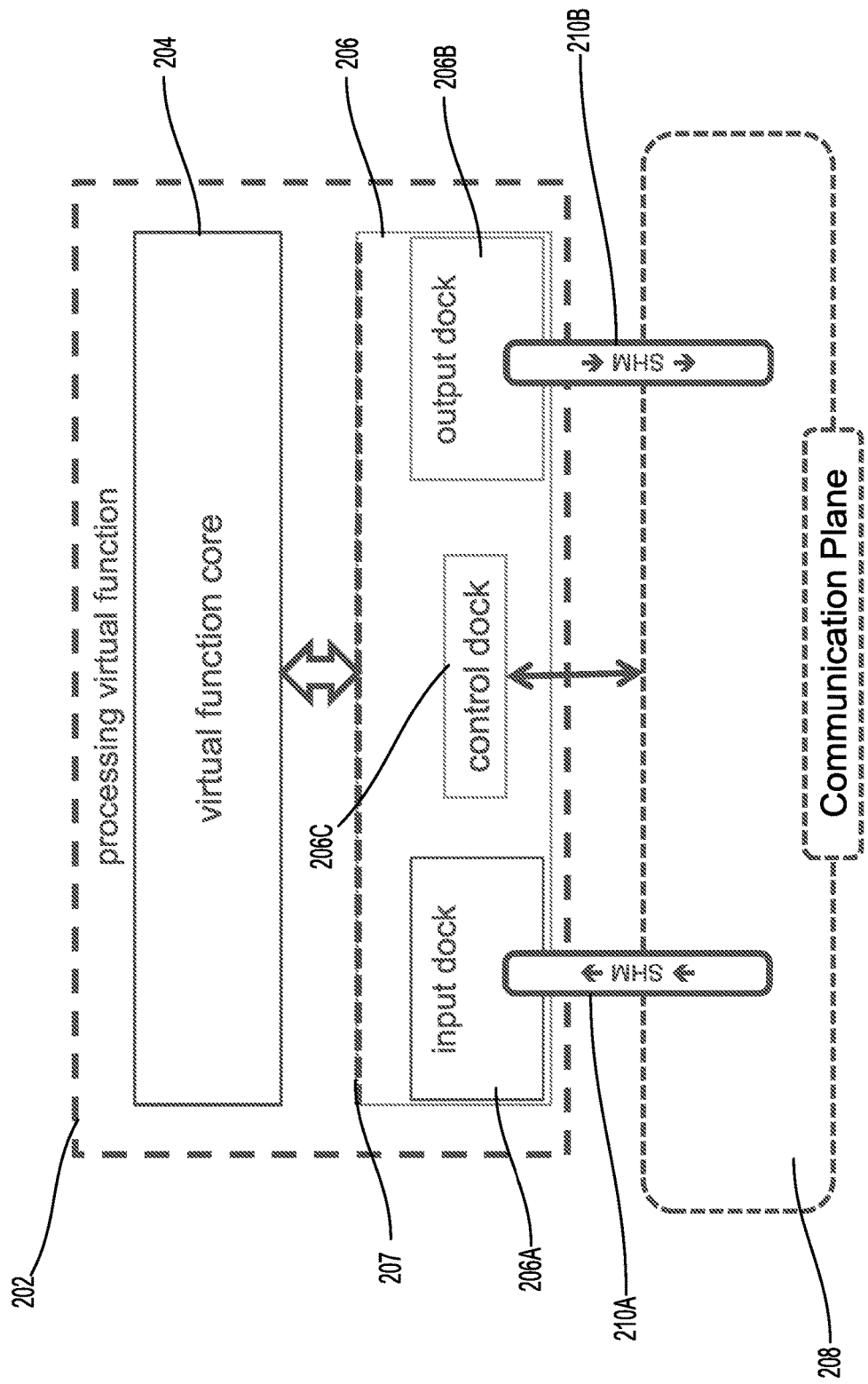
FIG. 2 illustrates an example communication plane and a virtual function (e.g., a virtual media application) configured for implementing a media processing chain, according to some aspects of the technology.

FIG. 2 illustrates an example of a processing virtual (media) function 202, e.g., a virtual media application deployment configured for implementing a media processing chain. Processing virtual function 202 is communicatively coupled with communication plane 208 through data transfer capabilities provided by shared memory units 210A, 210B. Processing virtual function 202 includes several software modules, including a virtual function core 204, and libraries 206, which further include an input dock 206A, an output dock 206B, and a control dock 206C. In the illustrated configuration, processing virtual function 202 is configured to communicate with libraries 206, via application programming interface (API) 207, and to coordinate control activities with communication plane via control dock 206C. It is understood that the illustrated modules used to implement processing virtual function 202 are provided to illustrate a conceptual implementation of the technology; however, a greater (or fewer) number of software modules may be implemented, without departing from the technology.

In practice, processing virtual function 202 can be configured to perform a specific media processing application on de-packetized media frames received from communication plane 208. For example, a packetized media stream (e.g., unprocessed media packets) received at communication plane 208 can be de-packetized to produce unprocessed media frames that are provided to processing virtual function 202 using shared memory 210A, and input dock 206A. De-packetization can be performed by one or more network nodes in the communication plane. For example, de-packetization may be performed by a receiving server and/or may be facilitated using software or hardware modules resident in a switch in communication plane 208.

In some aspects, input dock 206A, functioning in conjunction with control dock 206C, can be configured to throttle the unprocessed media frames that are provided to virtual function core 204. For example, input dock 206A may be configured to provide only complete media frames for processing, which may require the aggregation of multiple media frame portions as they are de-packetized and received from communication plane 208. It is understood that the implemented media applications can be configured to perform any type of transformation on a received media frame, such as, any uncompressed video or audio information that may be received from a live stream.

After media application processing is performed (e.g., using virtual function core 204 and libraries 206), processed media frames are outputted to communication plane 208 via output dock 206B, and shared memory 210B. Processed outputs of processing virtual function 202 can be provided to virtual functions e.g., that correspond with other media applications. As such, the sequential processing of a media stream by two or more virtualized medial processing applications can operate as a media processing service chain.

In some aspects, processed media frames must be re-packetized before they can be transported to a next virtual function in the processing chain. For example, processed media frames provided to shared memory 210B can be re-packetized in communication plane 208 (e.g., by a server and/or VPP switch, or similar device). After re-packetization media packets can be transported over the communication plane to a destination address, or to one or more intervening virtual media applications.

In other instances, processed media frame outputs of a given virtual media application may be provided directly to the next virtual function in the media processing chain, without the need for re-packetizing and de-packetizing. For example, for virtual machines or containers that share a common computing name-space, re-packetization of media frames may not be necessary. In such approaches, the output of processed media frames for a particularly virtual media application may be provided directly to a subsequent virtual media application, for example, using one or more shared memory allocations.

Figure 3:
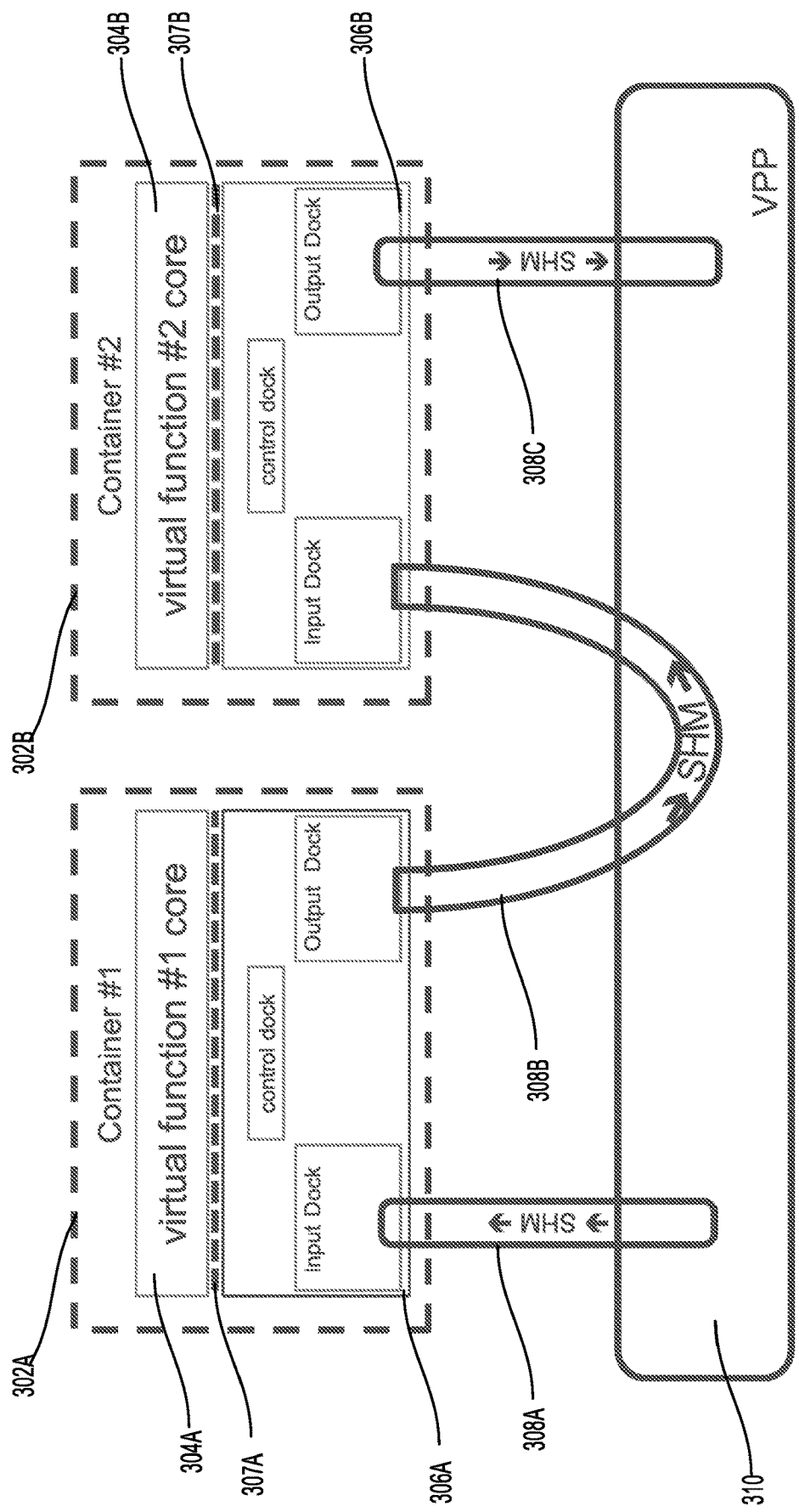
FIG. 3 illustrates an example of communication between multiple virtual media applications over a communication plane, according to some aspects of the technology.

FIG. 3 illustrates an example of communication between multiple virtual media applications 302A and 302B, over a communication plane that includes VPP switch 310. In particular, FIG. 3 illustrates an example embodiment in which different virtual media applications are instantiated in different networking containers (302A, 302B).

Specifically, virtual function #1 core (i.e., virtual media application 304A) is instantiated in container #1 (i.e., container 302A), and virtual function #2 core (i.e., virtual media application 304B) is instantiated in container #2 (i.e., container 302B). Container 302A further includes an API 307A that facilitates communication between libraries 306A and virtual media application 304A.

As discussed above with respect to FIG. 2, different virtual media applications may be communicatively coupled in a configuration that does not require re-packetization and de-packetization of media frames for transport. In the example of FIG. 3, unprocessed media packets received at VPP 310 can be provided to virtual media application 304A via shared memory 308A, and input dock 306A. Processed media frame outputs from virtual media application 304A can be provided directly to virtual media application 304B using shared memory 308B. That is, in configurations where virtual media applications are instantiated in different containers sharing a common namespace, media frame re-packetization may not be required for data transport between media applications. Ultimately, processed media frames, resulting from processing performed by virtual media application 304B, are provided back to VPP 310, via shared memory 308C.

Figure 4:
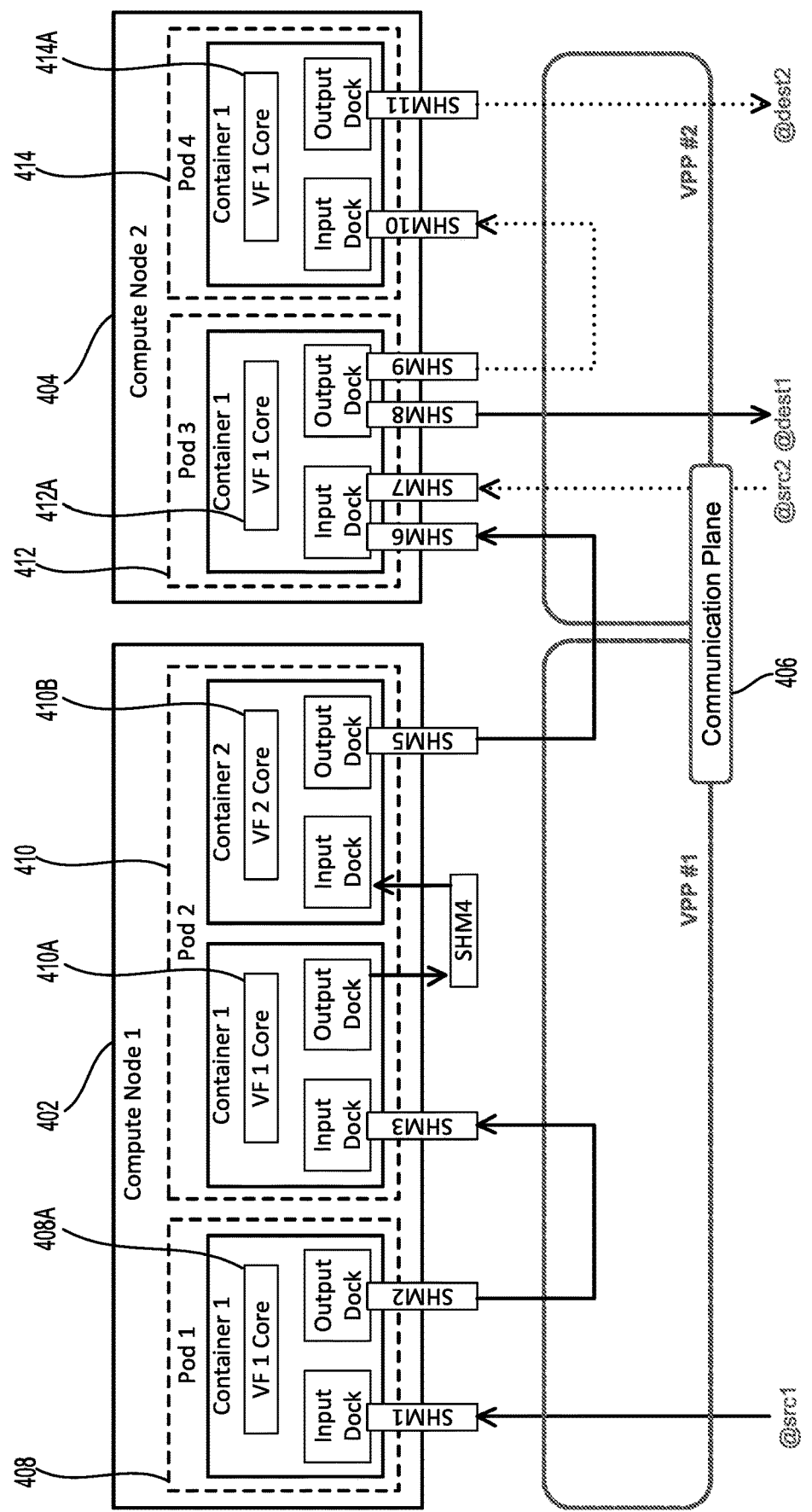
FIG. 4 illustrates an example of a media processing chain spanning multiple compute nodes, according to some aspects of the technology

FIG. 4. illustrates an example of a media processing chain spanning multiple compute nodes, according to some aspects of the technology. Virtual function (VF) cores, are instantiated across containers in network pods supported by Compute Node 1 402, and Compute Node 2 404. In the illustrated example, compute node 1 402 includes Pod 1 408, and Pod 2 410. Compute node 2 404 includes Pod 3 412, and Pod 4 414. In turn, Pod 1 408 includes Container 1 running VF 1 core 408A. Pod 2 410 includes Container 1, and Container 2, running VF 1 Core 410A, and VF 2 Core 410B, respectively. Pod 3 includes Container 1 running VF 1 Core 412A; and Pod 4 includes Container 1 running VF 1 Core 414A.

In practice, unprocessed media packets received by communication plane 406 from a media stream source (e.g., @src1) can be de-packetized and provided to VF 1 Core 408A in Pod 1 408, e.g., via a shared memory (SHM1). After processing by VF 1 Core 408A is complete, the processed media frames are provided to VF 1 Core 410 in Pod 2 410, via SHM2 and SHM3. In this transfer, re-packetization of the processed media frames can be avoided, since the media data is simply being copied from SHM2 to SHM3, e.g., using a "memcopy" command. Additional application processing of the @src1 media stream can then be performed by VF 1 Core 410A, and the output transferred to VF 2 Core 410B, e.g., via a memory shared between VF 1 Core 410A and VF2 Core 410B (SHM4).

Output from VF 2 Core 410B can be provided to communication plane 406 via a shared memory (e.g., SHM5). The VF 2 Core 410B output is received by a switching device in communication plane 406 (i.e., VPP #1), which re-packetizes the media frames, which are then transferred to VF 1 Core 412A via VPP #2 and SHM6. After processing at VF 1 Core 412A, the resulting processed media frames are provided back to VPP #2, for re-packetization and forwarding to a destination node (@dest).

Because IP switching and de-packetization is performed in the communication plane, media streams can be provided to any virtualized media application along the processing chain. Further to the example of FIG. 4, a media stream received from @src2 can be provided to a virtual media application residing in Pod 3 412 (e.g., VF 1 Core 412A), without being processed by virtual media applications in Pod 1 408 and Pod 2 410. That is, an unprocessed media stream can be de-packetized and provided to any virtual media application, for example, depending on the type of media processing that is required.

Figure 5:
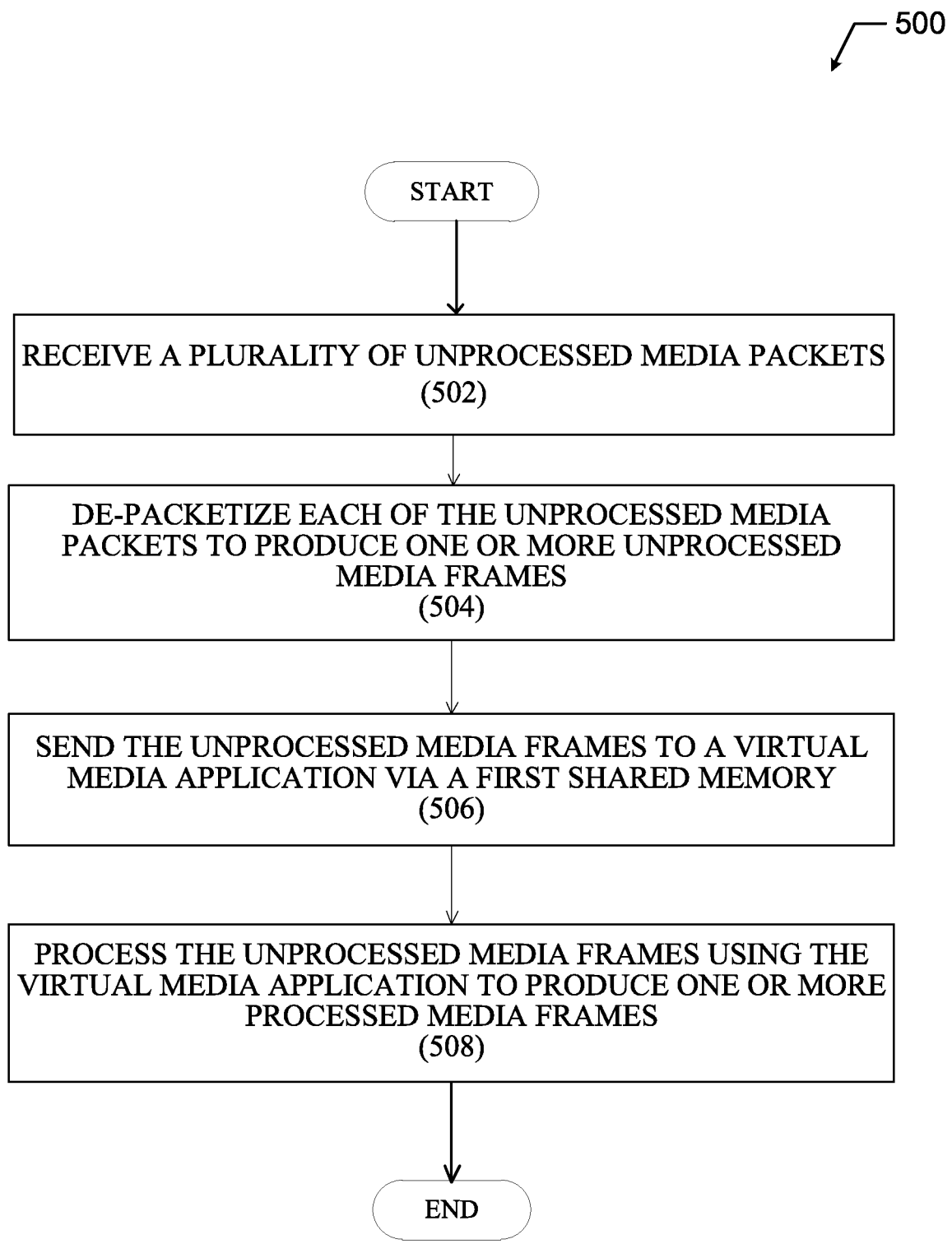
FIG. 5 illustrates steps of an example process for implementing a media processing chain, according to some aspects of the technology.

FIG. 5 illustrates steps of an example process 500 for implementing a media processing chain, according to some aspects of the technology. Process 500 begins with step 502 in which unprocessed media packets are received, for example, by a switching device in a control plane. The switching device may be a hardware-based or it may be implemented as a virtual switch (e.g., vSwitch) that is communicatively coupled with a physical network interface, such as a network interface card (NIC). In some aspects the switching device may be a VPP switch.

In step 504, de-packetization can be performed, e.g., by a server or specially configured switch in the communication plane. De-packetization of the unprocessed media packets produces one or more unprocessed media frames. In some aspects, de-packetization is performed by an API residing in the communication plane, for example, that is configured to output one or more media data frames for the received unprocessed media packets. In some aspects, the unprocessed media frames resulting from the de-packetization will contain a data fame IP header, a frame header and a data frame payload.

In step 506, the unprocessed media frames are sent to a virtual media application via a first shared memory. As discussed above, the virtual media application may be instantiated in a VM or network container. In some implementations, the virtual media application may be executed in a network container as part of a pod deployment. Additionally, the shared memory that facilitates transfer of the unprocessed media frames to the virtual media application may be a virtual memory allocation; however, in some aspects the shared memory may be a physical memory device.

In step 508, the virtual media application can perform processing on the unprocessed media frames to produce one or more processed media frames. Processing performed by the virtual media application can include any data manipulation to the unprocessed media frames. By way of example, the virtual media application may be used to up-convert the media stream (to a higher resolution), down-convert the media stream (to a lower resolution), or perform other manipulations, such as adding a watermark, etc. It is understood that virtual media application can implement any type of audio or video manipulation, without departing from the scope of the technology.

After application processing has been completed, the processed media frames can be outputted by the virtual media application, for example, using a memory space that is shared with the switching device. The resulting processed media frames may be provided to one or more subsequent virtual media applications, for example, without the need to re-packetize the processed data frames.

Alternatively, the processed data frames may be re-packetized at the receiving switch, for example, for forwarding through an IP network, such a media datacenter (Media-DC).

Figure 6:
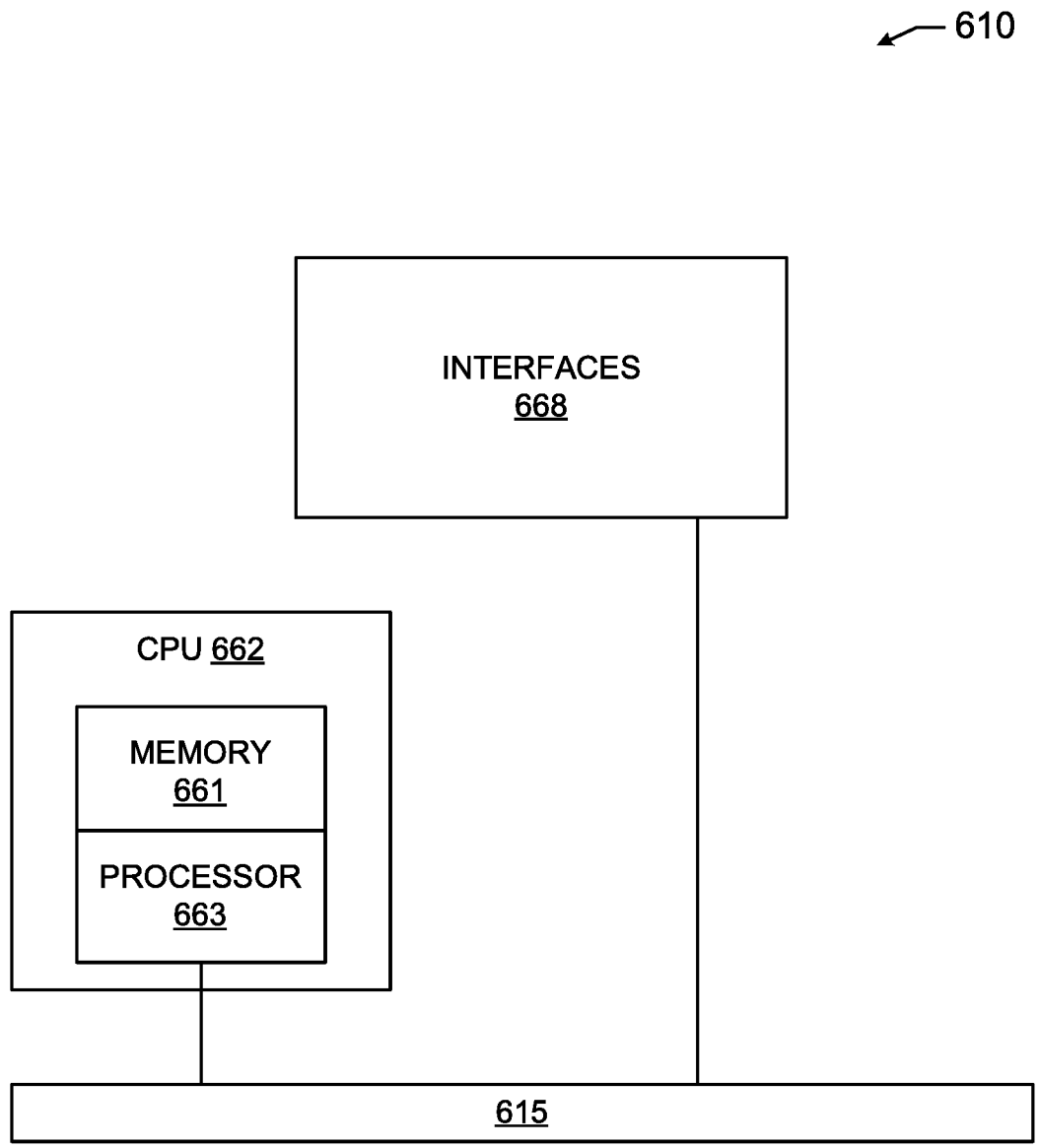
FIG. 6 illustrates an example network device on which some aspects of the technology can be implemented.

FIG. 6 illustrates an example network device on which some aspects of the technology can be implemented. Network device 610 includes master central processing unit (CPU) 662, interfaces 668, and a bus 615 e.g., a Peripheral Computer Interconnect (PCI) bus. CPU 662 can be configured to perform monitoring for one or more virtual network functions under the control of software including an operating system and any appropriate applications software. CPU 662 can include one or more processors 663, such as processors from the Intel, ARM, and/or Motorola family of microprocessors or the MIPS family of microprocessors. In an alternative embodiment, processor 663 is specially designed hardware for controlling the operations of network device 610. In a specific embodiment, a memory 661 (such as non-volatile RAM and/or ROM) also forms part of CPU 662. However, there are many different ways in which memory could be coupled to the system.

Interfaces 668 can be provided as interface cards (sometimes referred to as "network interface cards" (NICs) or "line cards"). Generally, they control the sending and receiving of data packets over the network and sometimes support other peripherals used with device 610. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), Point of Sale (POS) interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc. is often used. Further, other types of interfaces and media could also be used with the router. Regardless of the network device's configuration, it may employ one or more non-transitory memories or memory modules (including memory 661) configured to store program instructions for general-purpose network operations and mechanisms necessary to implement one or more steps of a service chain auto-tuning process of the subject technology.

For example, memory 661 can include a non-transitory computer-readable medium that includes instructions for causing CPU 662 to execute operations for receiving, at a first switch, a plurality of unprocessed media packets, de-packetizing, at the first switch, each of the plurality of unprocessed media packets to produce one or more unprocessed media frames, sending the unprocessed media frames from the first switch to a first virtual media application via a first shared memory, and processing the unprocessed media frames, using the first virtual media application, to produce one or more processed media frames.

In some aspects, the non-transitory computer-readable storage medium may further include instructions to cause one or more processors to perform operations including sending the processed media frames from the first virtual media application to the first switch via a second shared memory, and re-packetizing the one or more processed media frames, at the first switch, to produce one or more processed media packets.

Examples described above with reference to the accompanying figures provide an improvement to one or more aspects of existing methods and systems for processing media streams, and in particular, for processing live media streams that are generated by capture devices, such as microphones and/or video cameras, etc. The virtualization of media editing and processing hardware, such as physical SDI cards, can provide significant improvements in the deployment of media-editing and transport infrastructure. Media application virtualization facilitates access to media-editing applications, as well as the re-distribution of processed media content by enabling media processing to be performed within the context of a cloud infrastructure.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for processing a media stream, the method comprising:
   receiving, at a first switch, a plurality of unprocessed media packets;
   de-packetizing each of the plurality of unprocessed media packets to produce one or more unprocessed media frames;
   sending the one or more unprocessed media frames from the first switch to a first virtual media application via a shared input memory, wherein the first virtual media application is configured to throttle the one or more unprocessed media frames by holding one or more uncompleted media frames from being sent to the first virtual media application;
   processing the one or more unprocessed media frames using the first virtual media application to produce one or more processed media frames;
   sending, via a shared output memory, the one or more processed media frames from the first virtual media application to the first switch or a second virtual media application; and
   when the one or more processed media frames are sent to the first switch or the second virtual media application, re-packetizing the one or more processed media frames, at the first switch, to produce one or more processed media packets.

2. The computer-implemented method of claim 1, further comprising:

sending the one or more processed media packets to the second virtual media application via a second switch communicatively coupled to the first switch.

3. The computer-implemented method of claim 1, wherein the first virtual media application is instantiated inside a virtual machine (VM).

4. The computer-implemented method of claim 1, wherein the first virtual media application is instantiated inside a network container.

5. The computer-implemented method of claim 1, wherein the processing of the one or more unprocessed media frames is performed in response to a detection of at least one complete media frame assembled from the one or more unprocessed media frames.

6. A system comprising:
a non-transitory computer-readable storage medium with instructions stored therein which, when executed by one or more processors, cause the one or more processors to perform operations comprising:
receiving, at a first switch, a plurality of unprocessed media packets;
de-packetizing each of the plurality of unprocessed media packets to produce one or more unprocessed media frames;
sending the one or more unprocessed media frames from the first switch to a first virtual media application via a shared input memory, wherein the first virtual media application is configured to throttle the one or more unprocessed media frames by holding one or more uncompleted media frames from being sent to the first virtual media application;
processing the one or more unprocessed media frames using the first virtual media application to produce one or more processed media frames;
sending, via a shared output memory, the one or more processed media frames from the first virtual media application to the first switch or a second virtual media application; and
when the one or more processed media frames are sent to the first switch or the second virtual media application, re-packetizing the one or more processed media frames, at the first switch, to produce one or more processed media packets.

7. The system of claim 6, wherein the operations further include sending the one or more processed media packets to the second virtual media application via a second switch communicatively coupled to the first switch.

8. The system of claim 6, wherein the first virtual media application is instantiated inside a virtual machine (VM).

9. The system of claim 6, wherein the first virtual media application is instantiated inside a network container.

10. The system of claim 6, wherein the processing of the one or more unprocessed media frames is performed in response to a detection of at least one complete media frame assembled from the one or more unprocessed media frames.

11. A non-transitory computer-readable storage medium comprising instructions stored therein which, when executed by one or more processors, cause the one or more processors to perform operations comprising:
receiving, at a first switch, a plurality of unprocessed media packets;
de-packetizing each of the plurality of unprocessed media packets to produce one or more unprocessed media frames;
sending the one or more unprocessed media frames from the first switch to a first virtual media application via a shared input memory, wherein the first virtual media application is configured to throttle the one or more unprocessed media frames by holding one or more uncompleted media frames from being sent to the first virtual media application;
processing the one or more unprocessed media frames using the first virtual media application to produce one or more processed media frames; and
sending, via a shared output memory, the one or more processed media frames from the first virtual media application to the first switch or a second virtual media application and
when the one or more processed media frames are sent to the first switch or the second virtual media application, re-packetizing the one or more processed media frames, at the first switch, to produce one or more processed media packets.

12. The non-transitory computer-readable storage medium of claim 11, wherein the operations further include, when the one or more processed media frames are sent to the first switch, sending the one or more processed media packets to the second virtual media application via a second switch communicatively coupled to the first switch.

13. The non-transitory computer-readable storage medium of claim 11, wherein the first virtual media application is instantiated inside a virtual machine (VM).

14. The non-transitory computer-readable storage medium of claim 11, wherein the first virtual media application is instantiated inside a network container.

* * * * *